United States Patent [19]

Schneider et al.

[11] Patent Number: 5,336,711

[45] Date of Patent: Aug. 9, 1994

[54] BINDER COMPOSITION AND ITS USE FOR THE PRODUCTION OF COATING OR SEALING COMPOSITIONS

[75] Inventors: Volker Schneider; Harald Blum, both of Wachtendonk; Werner Kubitza; Joachim Probst, both of Leverkusen, all of Fed. Rep. of Germany

[73] Assignee: Bayer Aktiengesellschaft, Leverkusen, Fed. Rep. of Germany

[21] Appl. No.: 973,366

[22] Filed: Nov. 9, 1992

[30] Foreign Application Priority Data

Nov. 18, 1991 [DE] Fed. Rep. of Germany ....... 4137896

[51] Int. Cl.⁵ .............................................. C08L 67/00
[52] U.S. Cl. .................................... 524/507; 524/513; 524/591; 524/839; 524/840
[58] Field of Search ............... 524/507, 591, 513, 840, 524/839

[56] References Cited

U.S. PATENT DOCUMENTS 4,608,413  8/1986  Nachtkamp et al. ............... 524/591
4,717,738  6/1988  Fuduka et al. ..................... 526/209
5,075,370  12/1991  Kubitz et al. ...................... 524/591

FOREIGN PATENT DOCUMENTS 1280847  2/1991  Canada .

Primary Examiner—Joseph L. Schofer
Assistant Examiner—Jeffrey T. Smith
Attorney, Agent, or Firm—Joseph C. Gil; Thomas W. Roy

[57] ABSTRACT

The present invention relates to an aqueous binder composition containing

A) an aqueous solution or dispersion of a water-dilutable organic polyol component containing at least one polyester resin having carboxylate and hydroxyl groups and grafted with vinyl monomers and B) a polyisocyanate component which is emulsified in the aqueous solution or dispersion A), has a viscosity at 23° C. of 50 to 10,000 mPa.s and contains at least one organic polyisocyanate, wherein the binder composition has an NCO/OH equivalent ratio of 0.5:1 to 5:1, based on the isocyanate groups of component B) and the alcoholic hydroxyl groups of component A).

The present invention also relates to a process for the production of a coating or sealing composition containing this aqueous binder composition.

10 Claims, No Drawings

BINDER COMPOSITION AND ITS USE FOR THE PRODUCTION OF COATING OR SEALING COMPOSITIONS

BACKGROUND OF THE INVENTION

1. Field of the Invention

The present invention relates to an aqueous binder composition based on polyisocyanates and water soluble or water dispersible polyester resins grafted with vinyl monomers and containing carboxylate and hydroxyl groups and a process for the preparation of a coating or sealing composition containing such binder composition.

2. Description of the Prior Art

State of the art two-component polyurethane lacquers have acquired great importance in the coating industry due to their outstanding properties. They have, however, the disadvantage that considerable quantities of organic solvents are required for processing them and these solvents must subsequently be removed, e.g., by combustion. In many applications, especially non-industrial fields of application, such combustion cannot be carried out. Accordingly, there is an increased demand in these fields for coatings which have a high solids content and above all are dilutable in water so that the discharge of solvents and thus environmental pollution can be kept as low as possible.

The use of water as the liquid phase in two-component polyurethane lacquers containing free isocyanate groups is complicated by the fact that isocyanate groups react not only with alcoholic hydroxyl groups but also with water to form urea and carbon dioxide. This generally reduces the pot life, the time available for processing and the quality of the coatings to values which do not meet the practical requirements.

One possible solution is described in DE-OS 3 829 587, in which certain polyhydroxy polyacrylates are combined with polyisocyanates containing free isocyanate groups to form aqueous two-component compositions.

It has now surprisingly been found that special aqueous polyester resins grafted with vinyl monomers and containing carboxylate and hydroxyl groups can be used with polyisocyanates containing free isocyanate groups in aqueous two-component binders.

SUMMARY OF THE INVENTION

The present invention relates to an aqueous binder composition containing
- A) an aqueous solution or dispersion of a water-dilutable organic polyol component containing at least one polyester resin having carboxylate and hydroxyl groups and grafted with vinyl monomers and
- B) a polyisocyanate component which is emulsified in the aqueous solution or dispersion A), has a viscosity at 23° C. of 50 to 10,000 mPa.s and contains at least one organic polyisocyanate, wherein the binder composition has an NCO/OH equivalent ratio of 0.5:1 to 5:1, based on the isocyanate groups of component B) and the alcoholic hydroxyl groups of component A).

The present invention also relates to a process for the production of a coating or sealing composition containing this aqueous binder composition by
- i) emulsifying a polyisocyanate component B) having a viscosity at 23° C. of 50 to 10,000 mPa.s and containing at least one organic polyisocyanate in an aqueous solution or dispersion of a water-dilutable organic polyol component A) containing at least one polyester resin having carboxylate and hydroxyl groups and grafted with vinyl monomers at an NCO:OH equivalent ratio of components A) and B) of 0.5:1 to 5:1 and
- ii) incorporating any optional auxiliaries and additives in the solution or dispersion A) before the addition of the polyisocyanate component.

DETAILED DESCRIPTION OF THE INVENTION

Component A) is an aqueous solution or dispersion of a polyol component. The aqueous solution or dispersion has a water content of 35 to 85% by weight, preferably 45 to 75% by weight; a viscosity at 23° C. of 10 to 30,000 mPa.s, preferably 50 to 10,000 mPa.s; and a pH of 5 to 10, preferably 6 to 9.

The polyol component contains at least 51% by weight, preferably not less than 80% by weight and more preferably 100% by weight, of at least one polyester resin grafted with vinyl monomers. The polyester resin preferably has a molecular weight ($M_n$, determined by gel permeation chromatography using calibrated polystyrene as standard) of 1500 to 50,000, preferably 3,000 to 25,000; a hydroxyl number of 20 to 300, preferably 45 to 200, mg of KOH per g of solids (i.e., solid resin); and an acid number, based on all of the carboxyl groups (i.e., both carboxylic acid groups and carboxylate groups) of 10 to 80, preferably 14 to 45 mg of KOH/g of solids. Of the carboxyl groups, from 25 to 100%, preferably 40 to 100%, are present in the form of carboxylate groups.

In addition to the grafted polyester resins which are essential for this invention, the polyol component may contain other water-dilutable polyhydroxyl compounds which are compatible in aqueous solution or dispersion with the grafted polyester resins required for the invention. Examples include in particular water-soluble polyhydric alcohols having a molecular weight of 62 to 1000, preferably 62 to 400, which may optionally contain ether groups, such as ethylene glycol, propylene glycol, glycerol, trimethylolpropane, low molecular weight water-soluble ethoxylation and/or propoxylation products of these polyhydric alcohols, and mixtures of these compounds.

The polyester resins are present as solutions or dispersions, depending upon the molecular weight of the polyester resins grafted with vinyl monomers, the quantity of carboxyl and carboxylate groups, the nature of the neutralizing agent and any auxiliary solvent which may be present. Generally, they are present partly in solution and partly in dispersion.

The polyester resins containing carboxylate and hydroxyl groups and grafted with vinyl monomers are prepared by the polymerization of a monomer mixture I containing acid groups in a polyester resin II.

The polymerization is generally carried out as follows:

I) 2 to 99, preferably 10 to 95%, more preferably 50 to 90%, of a monomer mixture containing
   1) 1 to 100%, preferably 1 to 50%, more preferably 1 to 25%, of α,β-unsaturated mono- or dicarboxylic acids having 3 to 16, preferably 3 to 4 carbon atoms, 2) 0 to 70%, preferably 0 to 50%, more preferably 0 to 40%, of hydroxy-functional esters of an unsaturated $C_3$-$C_6$-carboxylic acids, in particular (meth)acrylic acid, preferably hydroxy-functional esters of these acids having a hydroxyalkyl group with 2 to 12 carbon atoms optionally containing ether groups, in particular hydroxy-functional alkyl esters of these said acids having 2 to 6 carbon atoms in the hydroxyalkyl group, 3) 0 to 98%, preferably 0 to 90%, more preferably 0 to 80%, of (meth)acrylic acid (cyclo)alkyl esters having 1 to 20, preferably 1 to 18 carbon atoms in the (cyclo)alkyl group and 4) 0 to 80%, preferably 0 to 60%, more preferably 0 to 40%, of other copolymerizable compounds, wherein the percentages of 1) to 4) are based on weight and add up to 100%, are polymerized in the presence of II) 1 to 98%, preferably 5 to 90%, more preferably 10 to 50%, of a polyester polyol having a hydroxyl number of 10 to 500, preferably 80 to 350, mg of KOH per g of substance and an acid number below 30, preferably below 5, mg of KOH/g of substance and containing 0 to 15%, preferably 0.01 to 10% and more preferably 0.1 to 5%, of double bonds (calculated as C=C, molecular weight=24), wherein the percentages of I) and II) are based on weight and add up to 100%.

Component 1) may be any unsaturated monomer containing at least one carboxyl group per molecule and satisfying the requirements previously set forth or a mixture of such monomers. Acrylic acid and/or methacrylic acid are preferably used as component 1).

Other suitable ethylenically unsaturated acids include ethyl acrylic acid, crotonic acid, maleic acid, fumaric acid, itaconic acid, maleic acid mono(meth)acryloyloxy ethyl ester, succinic acid mono(meth)acryloyloxy ethyl ester or phthalic acid mono(meth)acryloyloxy ethyl ester.

Component 2) may be any copolymerizable, ethylenically unsaturated monomer having at least one hydroxyl group per molecule or a mixture of such monomers. Examples include hydroxyalkyl esters of acrylic acid, methacrylic acid or another $\alpha,\beta$ ethylenically unsaturated carboxylic acid. These esters may be derived from a polyalkylene glycol having in particular up to 12 carbon atoms which is esterified with the acid or they may be obtained by reaction of the acid with an alkylene oxide. Examples of these esters include polyethylene glycol mono(meth)acrylate having up to 12 carbon atoms in the polyethylene glycol group. The compounds used as component 2) are preferably hydroxyalkyl esters of acrylic acid and methacrylic acid or mixtures of these hydroxyalkylesters.

Examples of these hydroxyalkyl esters include 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate and 4-hydroxybutyl methacrylate. Corresponding esters of other unsaturated esters, e.g., ethylacrylic acid, crotonic acid or similar acids having up to about 6 carbon atoms per molecule, may also be used. The preferred monomers of group 2) have 5 to 20 carbon atoms per molecule. Hydroxyalkyl esters of the above mentioned acids having from 2 to 6 carbon atoms in the hydroxyalkyl group are particularly preferred.

Any copolymerizable (cyclo)alkylester of (meth)acrylic acid having 1 to 20 carbon atoms in the (cyclo)alkyl group or a mixture of such (meth)acrylic acid esters may be used as component 3). Suitable esters for this purpose include in particular alkyl acrylates and alkyl methacrylates having 1 to 18 carbon atoms in the alkyl group. Examples include methyl, ethyl , n-propyl, n-butyl , n-hexyl, 2-ethylhexyl, n-stearyl and n-lauryl acrylate and methacrylate as well as cycloaliphatic (meth)acrylic acid esters, e.g., cyclohexyl (meth)acrylate.

Any compounds capable of copolymerizing with components 1, 2 and 3, including multiethylenically unsaturated compounds, or a mixture of such compounds may be used as component 4). Examples include styrene, $\alpha$-alkylstyrene, vinyl toluene, vinyl pyrrolidone, vinyl ethers, vinyl esters, divinylbenzene and di(meth)acrylic acid esters of diols such as ethanediol, 1,3-propanediol and 1,4-butanediol. Mixtures of the monomers exemplified under 1) to 4) may also be used.

The polyester polyols used as component II are prepared by the known polycondensation of $a_1$) 0 to 60% by weight of an aliphatic saturated or aromatic monocarboxylic acid, $a_2$) 10 to 65% by weight of an aliphatic saturated or aromatic di-, tri- and/or tetracarboxylic acid and-/or a corresponding quantity of their anhydrides, $a_3$) 15 to 70% by weight of difunctional and/or higher functional alcohols, $a_4$) 0 to 30% by weight of monohydric alcohols, $a_5$) 0 to 25% by weight of hydroxycarboxylic acids, lactones, amino alcohols and/or aminocarboxylic acids and $a_6$) 0 to 60% by weight of (cyclo)aliphatic olefinically unsaturated mono- or dicarboxylic acids, wherein the percentages of $a_1$) to $a_6$) add up to 100%. This reaction may be carried out with the aid of conventional esterification catalysts, preferably by the method of solvent-free or azeotropic condensation at temperatures of 140° to 240° C. with removal of water.

Component $a_1$) is selected from monocarboxylic acids having a molecular weight of 112 to 340. Examples of suitable monocarboxylic acids include benzoic acid, tert.-butylbenzoic acid, hexahydrobenzoic acid and saturated fatty acids such as 2-ethylhexanoic acid, isononanoic acid, coconut oil fatty acid, hydrogenated commercial fatty acids and fatty acid mixtures, decanoic acid, dodecanoic acid, tetradecanoic acid, stearic acid, palmitic acid, docosanoic acid and mixtures of these or other monocarboxylic acids.

Component $a_2$) is selected from di -, tri - and/or tetracarboxylic acids or their anhydrides having a molecular weight of 98 to 600. Suitable compounds include phthalic acid (arthydride), isophthalic acid, terephthalic acid, hexahydrophthalic acid (anhydride), succinic acid (anhydride), adipic acid, sebacic acid, azelaic acid, dimeric fatty acids, trimeric fatty acids, trimellitic acid (arthydride), pyromellitic acid (anhydride) and mixtures of these or other acids.

Starting component $a_3$) is selected from diols, triols, tetraols or higher valent alcohol components having a molecular weight of 62 to 400. Suitable compounds include ethylene glycol, 1,2- and 1,3-propylene glycol, 1,3-, 1,4- and 2,3-butanediol, 1,6-hexanediol, 2,5-hexanediol, trimethylhexanediol, diethylene glycol, triethylene glycol, hydrogenated bisphenols, 1,4-cyclohexanediol, 1,4-cyclohexanedimethanol, trimethylpropane, glycerol, pentaerythritol, trimethylpentanediol, dipentaerythritol and mixtures of these or other polyhydric alcohols.

Starting component $a_4$) is selected from monohydric alcohols having a molecular weight of 100 to 290. Suitable compounds include n-hexanol, cyclohexanol, decanol, dodecanol, tetradecanol, octanol, octadecanol, natural fatty alcohol mixtures such as Ocenol 110/130 (Henkel Company) and mixtures of these or other alcohols.

Starting component $a_5$) is selected from hydroxycarboxylic acids having 2 to 10 carbon atoms, lactones of such acids, aminoalcohols having a molecular weight of 61 to 300 and/or aminocarboxylic acids having a molecular weight of 75 to 400. Examples include diethylolpropionic acid, lactic acid, malic acid, tartaric acid, $\epsilon$ caprolactone, aminoethanol, aminopropanol, diethanolamine, aminoacetic acid and aminohexanoic acid.

Starting component $a_6$) is selected from (cyclo)aliphatic mono- or dicarboxylic acids containing at least one double bond, e.g. (meth)acrylic acid, maleic acid (anhydride), fumaric acid, crotonic acid, tetrahydrophthalic acid (anhydride), unsaturated fatty acids such as soya bean oil fatty acid, tall oil fatty acid or safflower oil fatty acid and mixtures of these or other unsaturated mono- or dicarboxylic acids.

Preferred polyester polyols II contain
$a_1$) 0 to 55% by weight of the previously described monocarboxylic acids, preferably those having 7 to 20 carbon atoms such as benzoic acid, 2-ethylhexanoic acid, isononanoic acid, hydrogenated commercial fatty acids and mixtures thereof (e.g., Prifrac 2950, Prifrac 2960 and Prifrac 2980, available from Unichema International), stearic acid and/or palmitic acid,
$a_2$) 15 to 56% by weight of the previously described di- and/or tricarboxylic acids or their anhydrides such as phthalic acid anhydride, hexahydrophthalic acid anhydride, isophthalic acid, terephthalic acid, adipic acid, benzene tricarboxylic acid and/or dimeric fatty acid,
$a_3$) 25 to 63% by weight of the previously described difunctional and/or higher functional alcohols such as ethylene glycol, 1,2-propylene glycol, 1,6-hexanediol, 1,4-cyclohexane dimethanol, neopentyl glycol, trimethylolpropane, glycerol and/or pentaerythritol, and
$a_6$) 0.01 to 30% by weight of the previously described mono- or dicarboxylic acids containing at least one double bond such as (meth)acrylic acid, maleic acid (anhydride), fumaric acid, tetrahydrophthalic acid (anhydride), crotonic acid and natural and synthetic unsaturated fatty acids.

When azeotropic esterification is carried out, the entrainer, which is usually isooctane, xylene, toluene or cyclohexane, is distilled off under vacuum after the reaction.

The polyester polyols II preferably consist of polycondensation products of the starting components exemplified above. For obtaining particular properties, however, the polyester polyols may be subjected to a modifying reaction before the grafting reaction, for example, a reaction with mono- or polyisocyanates to incorporate urethane groups. This modification may also be carried out in the presence of low molecular weight hydroxy-functional, carboxy-functional or amino-functional substances, which are then incorporated in the polymer with chain lengthening. Examples of suitable low molecular weight substances include 1,6-hexanediol, neopentyl glycol, stearyl alcohol, dimethylol propionic acid, 6-aminohexanoic acid, aminoethanol and 1,4-cyclohexanedimethanol.

Phenyl isocyanate and stearyl isocyanate are examples of suitable monoisocyanates. Examples of suitable polyisocyanates include hexamethylene diisocyanate, isophorone diisocyanate, tolylene diisocyanate and higher functional isocyanates containing uretdione, urethane, urea, biuret and/or isocyanurate groups. In the context of this invention, the term "polyester resins" used for naming the graft basis is used to denote not only the unmodified polycondensation products but also the urethane group-containing modification products of the polycondensation products.

Preparation of the grafted polyester resins may, for example, be carried out as follows:

Components 1) to 4), partly as mixtures or separately, are simultaneously added to component II which is optionally mixed with a suitable solvent and the components are polymerized therein in the presence of at least one polymerization initiator. For obtaining particular properties, one or more monomers may be added more rapidly or more slowly or their addition may begin earlier and/or later than that of the other monomers.

The organic solvents used are those conventionally used for the preparation of polyacrylate resins and suitable for the preparation of aqueous dispersions. Examples of suitable solvents include 2-methoxypropanol, n-butanol, methoxybutanol, n-propanol, ethylene glycol monomethylether, ethylene glycol monoethylether, ethylene glycol monobutylether, diethylene glycol monomethylether, diethylene glycol monoethylether, diethylene glycol diethylether, diethylene glycol monobutylether, 3-methyl-3-methoxybutanol and mixtures thereof.

Solvents which are immiscible with water and have a boiling point below 100° C. or which form a heterogeneous azeotropic mixture with water may also be used, e.g., 2-butanone, toluene, xylene, butyl acetate, solvent naphtha, methyl isobutyl ketone and mixtures thereof.

The organic solvents used may be removed from the reaction mixture before, during or after dispersion, either completely or partially and optionally azeotropically and/or by the application of a vacuum or a powerful stream of inert gas.

The polymerization initiators used are also compounds which are known for this purpose. Examples of suitable compounds include peroxides which form free radicals such as benzoyl peroxide, tert.-butyl perbenzoate, tert.-butyl per-2-ethylhexanoate and di-tert.-butylperoxide; and azo initiators such as azo-bis-butyronitrile; and mixtures of these compounds.

Polymerization is carried out at a temperature of 60° to 180° C., preferably 110° to 160° C.

Molecular weight regulators such as dodecylmercaptan or mercaptoethanol may be added in quantities of 0.01 to 6% for obtaining the desired molecular weight.

During the polymerization reaction in the presence of the polyester resins, at least partial linking of the polyester resins with the polymer takes place through a graft copolymerization. Linkages by copolymerization (when olefinically unsaturated polyester resins are used) or by a condensation reaction via carboxyl or hydroxyl groups could take place. For the sake of simplicity, the resulting reaction products are described in the context of this invention as "polyester resins grafted with vinyl monomers" or "graft copolymers."

From 25 to 100%, preferably 40 to 100% of the free carboxyl groups present in the graft copolymers are converted into carboxylate groups before or during the process of dispersion by the addition of at least one base. Suitable bases include ammonia, N-methylmorpholine, triethylamine, dimethylethanolamine, methyldiethanolamine, triethanolamine, morpholine, tripropylamine, ethanolamine, triisopropylamine, 2-amino-2-methyl-1-propanol and mixtures of these and other neutralizing agents. Sodium hydroxide, lithium hydroxide and potassium hydroxide may also be used as neutralizing agents, but are less preferred. Ammonia and dimethylethanolamine are preferred neutralizing agents.

In the process of dispersion (by "process of dispersion" is meant the conversion of the graft copolymers into an aqueous solution and/or dispersion; the aqueous systems generally contain both dissolved and dispersed constituents) the mixture of water and neutralizing agent may be added to the resin, the water may be added to the mixture of resin and neutralizing agent, the resin may be added to the mixture of water and neutralizing agent or the mixture of resin and neutralizing agent may be added to the water. The dispersibility of the resins in water may, if desired, be improved by the addition of external ionic or non-ionic emulsifiers such as ethoxylated nonyl phenol during the process of dispersion.

The process of dispersion is normally carried out at 40° to 120° C. The aqueous binder components A) containing carboxylate and hydroxyl groups have solids contents (i.e., the amount of dissolved and/or dispersed polyester resins grafted with vinyl monomers) of 25 to 65% by weight, preferably 30 to 55% by weight. The proportion of organic solvents is less than 8, preferably less than 6 and most preferably less than 2.5% by weight.

The aqueous solution or dispersion of graft copolymers obtained after the process of dispersion may be used directly as component A) of the binder compositions according to the invention. However, the dispersion may also be mixed with other organic polyhydroxyl compounds, in particular with previously described water-soluble polyhydric alcohols, provided that the requirements concerning NCO/OH equivalent ratio are observed. As previously discussed, the polyol component dissolved and/or dispersed in component A) contains at least 51% by weight, preferably at least 80% by weight and most preferably 100% by weight of graft copolymers according to the invention.

Polyisocyanate component B) may be any organic polyisocyanates which have aliphatically, cycloaliphatically, araliphatically and/or aromatically bound free isocyanate groups and are liquid at room temperature. Polyisocyanate component B) generally has a viscosity at 23° C. of 50 to 10,000 mPa.s, preferably 50 to 1000 mPa.s. Polyisocyanate component B) is preferably selected from polyisocyanates or polyisocyanate mixtures having aliphatically or cycloaliphatically bound isocyanate groups, an (average) isocyanate functionality of 2.2 to 5.0 and a viscosity at 23° C. of 50 to 500 mPa.s.

If necessary, the polyisocyanates may be used together with small quantities of inert solvents to lower the viscosity to a value within the ranges mentioned above. Such solvents should, however, be added at most in quantities resulting in a maximum of 20% by weight of solvent, based on the quantity of water, in the coating compositions finally obtained. Any solvent still present in the polyester dispersions or solutions should be included in this calculation.

Solvents suitable as additives for the polyisocyanates include aromatic hydrocarbons such as "solvent naphtha" or the solvents previously described for use with component A).

Preferred polyisocyanates are the "modified polyisocyanates" prepared from hexamethylene isocyanate, 1-isocyanato-3,3,5-trimethyl-5-isocyanatomethylcyclohexane (IPDI) and/or bis-(isocyanatocyclohexyl)-methane, in particular those prepared exclusively from hexamethylene diisocyanate. These "modified polyisocyanates" contain biuret, urethane, uretdione and/or isocyanurate groups and are prepared in known manner from the above diisocyanate and then freed from excess starting diisocyanate down to a residue of less than 0.5% by weight, preferably by distillation.

The preferred aliphatic polyisocyanates to be used according to the invention include biuret group-containing polyisocyanates based on hexamethylene diisocyanate which may be prepared, for example, by the processes described in U.S. Pat. Nos. 3,124,605, 3,358,010, 3,903,126, 3,903,127 and 3,976,622. These polyisocyanates are mixtures of N,N',N"-tris-(6-isocyanatohexyl)-biuret with minor quantities of its higher homologues. Other preferred polyisocyanates are the cyclic trimers of hexamethylene diisocyanate which may be obtained according to U.S. Pat. No. 4,324,879 and contain mixtures of N,N',N"-tris-(6-isocyanatohexyl)-isocyanurate mixed with minor quantities of its higher homologues.

Mixtures of polyisocyanates prepared from hexamethylene diisocyanate and containing uretdione and/or isocyanurate groups are particularly preferred. These polyisocyanates are prepared by the catalytic oligomerization of hexamethylene diisocyanate using trialkylphosphines as catalysts and preferably have a viscosity at 23° C. of 50 to 500 mPa.s and an isocyanate functionality of 2.2 to 5.0.

"Modified polyisocyanates" prepared from 2,4-diisocyantotoluene or commercial mixtures thereof with 2,6-diisocyanatotoluene prepared from 4,4'-diisocyanatodiphenylmethane or mixtures thereof with its isomers and/or higher homologues are also suitable, but less preferred. Examples of such aromatic lacquer polyisocyanates include the urethane group-containing isocyanates obtained by reacting excess quantities of 2,4-diisocyanatotoluene with polyhydric alcohols such as trimethylolpropane followed removal of unreacted diisocyanate by distillation. Other examples of aromatic modified polyisocyanates include the trimers of the monomeric diisocyanates exemplified above, i.e., the corresponding isocyanatoisocyanurates, which have also preferably been freed from excess monomeric diisocyanates by distillation after their preparation.

Hydrophilically modified polyisocyanates, for example, polyisocyanates which have been rendered hydrophilic with polyethylene oxide or with neutralized acid groups, may also be used as cross-linking components. In some cases certain properties of the binder compositions for example their compatibility can be improved in this way.

Unmodified polyisocyanates may also be used if they satisfy the previously described requirements concerning their viscosity. Polyisocyanate component B) may consist of mixtures of the polyisocyanates exemplified above.

To prepare the aqueous binder compositions, polyisocyanate component B) is emulsified in the aqueous binder component A). The dissolved or dispersed modified polyester resin functions as an emulsifier for the added polyisocyanate although this function may also be assisted by the addition of external emulsifiers. The process may be carried out by simply stirring the components at room temperature. The quantity of polyisocyanate component used is calculated to result in an NCO/OH equivalent ratio, based on the isocyanate groups of component B) and the alcoholic hydroxyl groups of component A), of 0.5:1 to 5:1, preferably 0.8:1 to 2:1.

The known auxiliary agents and additives of coatings technology may optionally be incorporated with component A), i.e., the aqueous solution or dispersion of the polyol component, before polyisocyanate component B) is added. These additives include defoamants, thickeners, levelling agents, pigments, dispersing auxiliaries for the distribution of pigments, and the like.

The preparation of coating compositions containing the aqueous binder compositions according to the invention as the binder is thus preferably carried out by a multistage process wherein a) the graft copolymer containing carboxylate and hydroxyl groups is prepared in a first reaction step according to the previously described process, b) the resulting graft copolymer is dissolved and/or dispersed in water in a second step and the resulting aqueous solution or dispersion is optionally mixed with other water-dilutable polyhydroxyl compounds and/or the known auxiliary agents and additives of coatings technology and c) polyisocyanate component B) is then emulsified in the aqueous solution or dispersion in a third step.

The coating compositions according to the invention are suitable for all fields of application in which solvent-containing, solvent-free or aqueous paints and coating systems with superior properties are presently used. Examples include the coating of various mineral surfaces of building materials such as plaster bound with lime and/or cement, surfaces containing gypsum, fiber-reinforced cement building materials and concrete; the lacquering and sealing of wood and wood products such as chipboard, wood fiber boards and paper; the coating and sealing of metallic surfaces; the coating and sealing of road surfaces containing asphalt or bitumen; and the coating and sealing of various synthetic resin surfaces. The coating compositions are also suitable for use as adhesives for joining together either similar or different materials. The coating compositions according to the invention may be used as primers or fillers or as binders for top coats.

The lacquer films may be dried at room temperature or at elevated temperature, e.g., at 80°, or under stoving conditions at up to 260° C.

The percentages given in the following examples are all percentages by weight unless otherwise indicated.

EXAMPLES

Starting Materials:

Preparation of Polyester Precursors aI) to aIV)

aI)

1312 g of hexahydrophthalic acid anhydride, 144 g of tetrahydrophthalic acid anhydride, 1703 g of trimethylolpropane and 1812 g of a saturated $C_{14}/C_{16}$ fatty acid mixture (Prifrac 2950, Unichema International) were weighed into a 6 liter reaction vessel equipped with stirrer, cooling and heating device and water separator, and the mixture was heated to 140° C. in one hour while nitrogen was passed through. The mixture was then heated to 220° C. in 8 hours. The condensation reaction with elimination of water was carried out until polyester aI) had a total acid content of 3.0 and an OH number of 137.

aII)

771.8 g of trimethylolpropane, 476.1 g of phthalic acid anhydride, 63.3 g of maleic acid anhydride, 939.3 g of adipic acid, 759.0 g of 1,6-hexanediol and 669.2 g of neopentyl glycol were weighed into a 6 liter reaction vessel equipped with stirrer, cooling and heating device and water separator, and the reaction mixture was heated to 140° C. in one hour while nitrogen was passed through. The mixture was then heated to 200° C. in 6 hours and the condensation reaction with elimination of water was carried out until the acid number had fallen below 12 mg KOH/g. 321.4 g of Prifrac 2950 (Unichema International) were then added and condensation with elimination of water was carried out at 200° C. until polyester aII) had a total acid number of 2.0 and an OH number of 298.

aIII)

402 g of trimethylolpropane, 1416 g of 1,6-hexanediol, 1110 g of phthalic acid anhydride, 147 g of maleic acid anhydride and 438 g of adipic acid were weighed into a 6 liter reaction vessel equipped with stirrer, cooling and heating device and water separator, and the mixture was heated to 140° C. in one hour while nitrogen was passed through. The reaction mixture was then heated to 220° C. in 8 hours and the condensation reaction with elimination of water was carried out until polyester aIII) had a total acid number of 6.5 and an OH number of 111.

aIV)

831.6 g of hexahydrophthalic acid anhydride, 58.8 g of maleic acid anhydride, 1206.0 g of trimethylolpropane and 1150.8 g of Prifrac 2950 (Unichema International) were weighed into a 4 liter reaction vessel equipped with stirrer, cooling and heating device and water separator, and the reaction mixture was heated to 140° C. within one hour while nitrogen was passed through. The reaction mixture was then heated to 220° C. in 8 hours and the condensation reaction with elimination of water was carried out until polyester aIV) had a total acid number of 5.0 and an OH number of 129.

Preparation of Aqueous Binder Components $A_1$ to $A_5$ $A_1$ 166.7 g of polyester precursor aI) were introduced into a 2 liter reaction vessel equipped with stirrer and cooling and heating device and heated to 135° C. A mixture of 225.0 g of n-butylacrylate, 25.0 g of methacrylic acid, 50.0 g of styrene, 100.0 g of hydroxyethylmethacrylate, 100.0 g of methylmethacrylate and 5.0 g of n-dodecylmercaptan was added to the polyester over a period of 3 hours. Simultaneously with the addition of the monomer mixture, 35.7 g of tert.-butyl per-2-ethylhexanoate (70% in a hydrocarbon mixture) were added over a period of 4 hours. Stirring was continued for 2 hours at 135° C. after all of the peroxide had been added and the grafted polyester resin was neutralized with 17.7 g of dimethylethanolamine and dispersed in 1045.0 g of water. The solids content was adjusted to about 33.4% by the addition of water.

Polyester resin A$_1$ was grafted with vinyl monomers and had an OH number of about 103 and an acid number of about 26. The degree of neutralization was about 61%.

A$_2$ 166.7 g of polyester precursor aIV) and 36.7 g of xylene were introduced into a 2 liter reaction vessel equipped with stirrer and cooling and heating device and the mixture was heated to 135° C. A mixture of 225.0 g of n-butylacrylate, 25.0 g of methacrylic acid, 50.0 g of styrene, 100.0 g of hydroxyethylmethacrylate, 100.0 g of methylmethacrylate and 5.0 g of n-dodecylmercaptan was added to the polyester solution over a period of 3 hours. Simultaneously, 35.7 g of tert.-butyl per-2-ethylhexanoate (70% in a hydrocarbon mixture) were added over a period of 4 hours. The reaction mixture was stirred for 2 hours at 135° C. after all of the peroxide has been added. Grafted polyester resin A$_1$ was neutralized with 17.7 g of dimethylethanolamine and dispersed in 1045 g of water. The solids content was adjusted to about 34.1% by the addition of water after the solvent had been distilled off azeotropically.

Polyester resin A$_2$ was grafted with vinyl monomers and had an OH number of about 101 and an acid number of about 27. The degree of neutralization was about 59%.

A$_3$ 166.7 g of polyester precursor aII) and 36.7 g of ethylene glycol monobutyl ether were weighed into a 2 liter reaction vessel equipped with stirrer and cooling and heating device and the mixture was heated to 125° C. A mixture of 74.0 g of n-butylacrylate, 33.3 g of styrene, 100.0 g of hydroxyethylmethacrylate, 108.3 g of methylmethacrylate and 3.3 g of n-dodecylmercaptan was added to the polyester solution over a period of 2 hours. A mixture of 37.0 g of n-butylacrylate, 16.7 g of styrene, 50.0 g of hydroxyethylmethacrylate, 54.2 g of methylmethacrylate, 12.5 g of methacrylic acid, 14.0 g of acrylic acid and 1.7 g of n-dodecyl mercaptan was then added over a period of one hour. Simultaneously with the addition of the monomers, 35.7 g of tert.-butyl per-2-ethyhexanoate (70% in a hydrocarbon mixture) were added over a period of 4 hours. The reaction mixture was stirred for 2 hours at 125° C. after all of the peroxide had been added. The grafted polyester resin was neutralized with 19.9 g of dimethylethanolamine and dispersed in 882 g of water. The solids content was adjusted to about 39.8% by the addition of water.

Polyester resin A$_3$ was grafted with vinyl monomers and had an OH number of about 175 and an acid number of about 35. The degree of neutralization was about 51%.

A$_4$ 166.7 g of polyester precursor aII) and 36.7 g of ethylene glycol monobutyl ether were weighed into a 2 liter reaction vessel equipped with stirrer and cooling and heating device and heated to 125° C. A mixture of 83.3 g of n-butylacrylate, 100.0 g of hydroxyethyl-methacrylate, 141.7 g of methylmethacrylate and 3.3 g of n-dodecylmercaptan was added to the polyester solution over a period of 2 hours. A mixture of 41.7 g of n-butylacrylate, 50.0 g of hydroxyethylmethacrylate, 70.8 g of methylmethacrylate, 12.5 g of methacrylic acid and 1.7 g of n-dodecylmercaptan was then added over a period of one hour. Simultaneously with the addition of the monomers, 17.9 g of tert.-butyl per-2-ethyl-hexanoate (70% in a hydrocarbon mixture) were added over a period of 4 hours. Stirring was continued for 2 hours at 125° C. after all the of peroxide had been added. The grafted polyester resin was neutralized with 19.6 g of dimethylethanolamine and dispersed with 780 g of water. The solids content was adjusted to about 43.2% by the addition of water.

Polyester resin A$_4$ was grafted with vinyl monomers and had an OH number of about 175 and an acid number of about 18. The degree of neutralization was about 100%.

A$_5$ 100.0 g of polyester precursor aII) and 0.2 g of Desmorapid 50 (Bayer AG, Leverkusen) were weighed into a 2 liter reaction vessel equipped with stirrer and cooling and heating device and heated to 120° C. 4.0 g of hexamethylene diisocyanate were added to the polyester precursor and the mixture was stirred at 120° C. until the isocyanate content was below 0.1%. 22.1 g of ethylene glycol monobutyl ether were then added. A mixture of 85.8 g of n-butylacrylate, 49.1 g of methylmethacrylate, 61.3 g of hydroxyethylmethacrylate and 2.0 g of n-dodecylmercaptan was introduced over a period of 2 hours. A mixture of 42.9 g of n-butylacrylate, 24.5 g of methylmethacrylate, 30.7 g of hydroxyethylmethacrylate, 12.3 g of acrylic acid and 1.1 g of n-dodecyl-mercaptan was then added over a period of one hour. Simultaneously with the addition of the monomers, 11.0 g of tert.-butyl per-2-ethylhexanoate (70% in a hydrocarbon mixture) were introduced over a period of 4 hours. Stirring was continued for 2 hours at 120° C. after all of the peroxide had been added. The grafted polyester resin was neutralized with 12.0 g of dimethylethanolamine and dispersed with 477 g of water. The solids content was adjusted to 38.7 g by the addition of water.

Polyester resin A$_5$ was modified with urethane groups and grafted with vinyl monomers and had an OH number of about 160 and an acid number of about 27. The degree of neutralization was about 66%.

Polyisocyanates B1 and B2

B1

A mixture of 70 parts by weight of a uretdione group—containing, i.e., dimerized hexamethylene diisocyanate, having two terminal free NCO groups and 30 parts by weight of hexamethylene diisocyanate substantially trimerized to N,N',N"-tris-(6-isocyanatohexyl)-isocyanurate containing minor quantities of higher homologues of both products. In its 100%, i.e., solvent-free form, polyisocyanate B1 had an average viscosity of 150 mPa.s/23° C. and an average free NCO group content of 22.5%.

B2

N,N',N"-tris-(6-isocyanatohexyl)-biuret with minor quantities of its higher homologues. The 100% product had an average NCO content of 22.5% by weight and an average viscosity of about 3000 mPa.s/23° C.

Example 1

100 parts by weight of polyester resin A$_3$ having a solids content of 39.8% by weight and a hydroxyl number of about 175, based on solids, were mixed with 0.79 parts by weight of a 25% by weight solution of a commercial emulsifier in water (Emulsifier WN, Bayer AG, Leverkusen), 1.49 parts by weight of a 20% by weight aqueous solution of a commercial non-ionic polyurethane thickener (Acrysol RM 8, Rohm and Haas, Frankfurt) and 0.6 parts by weight of a commercial defoamant (Bevaloid 581 B, Erbslöh, Düsseldorf). A hydroxyl component which had unlimited storage stability was obtained for use in an aqueous two-component polyurethane coating composition.

35.5 parts by weight of polyisocyanate B1 were added to the formulation described above and homogenized by stirring. The water based two-component polyurethane coating composition had an NCO/OH equivalent ratio of 1.5. The processing time was 3 to 4 hours.

Films applied in a wet film thickness of 200 μm (corresponding to a dry film thickness of about 50 μm) were found to be surface dry within 2 to 3 hours and completely dry (i.e., no imprint from firm thumb pressure) in 5 hours. The completely reacted, tough, flexible film had the following properties:

Optical (gloss/transparency): very good
Pendulum hardness (Albert/König): 90 to 100"
Solvent resistance
Mineral spirits: very good
Solvent naphtha 100: very good
Methoxypropyl acetate: very good
Acetone: good to moderate
Ethanol: good.

Example 2

The hydroxyl component was prepared as described in Example 1. However, 47.5 parts by weight of a 75% solution of polyisocyanate B2 in methoxypropyl acetate/xylene 1:1 were used as the curing component. The mixture was homogenized by stirring. The processing time was 3 to 4 hours. Films applied in a wet film thickness of 200 μm were stoved for 30 minutes at 120° C. after exposure to air for 30 minutes. The completely reacted film had the following properties:

Optical (gloss/transparency): very good
Pendulum hardness (Albert/König): 170–180"
Solvent resistance
Mineral spirits: very good
Solvent naphtha 100: very good
Methoxypropyl acetate: very good
Acetone: good to moderate
Ethanol: good.

Example 3

100 Parts by weight of polyester resin A4 having a solids content of 43.2% by weight and a hydroxyl number of about 175, based on solids, were mixed with 0.86 parts by weight of the emulsifier solution from in Example 1, 1.62 parts by weight of the non-ionic polyurethane thickener from Example 1 and 0.6 parts by weight of the defoamant from Example 1). A hydroxyl component which had unlimited storage life was obtained for use in a water-dilutable two-component polyurethane coating composition.

38.4 parts by weight of polyisocyanate B1 were added to the hydroxyl component described above and homogenized by stirring. The water-based two-component polyurethane lacquer described above had an NCO/OH equivalent ratio of 1.5. The processing time was about 5 hours.

Films applied in a wet film thickness of 200 μm (corresponding to a dry film thickness of about 50 μm) were surface dry within 2 to 3 hours and completely dry within 6 to 8 hours. The completely cured, tough, flexible film (the curing process was completed after 2 to 4 weeks) had the following properties:

Optical (gloss/transparency): very good
Pendulum hardness (Albert/König): 80–90"
Solvent resistance
Mineral spirits: very good
Solvent naphtha 100: very good
Methoxypropyl acetate: very good
Acetone: moderate
Ethanol: good to moderate Example 4

The polyhydroxyl component was prepared as described in Example 3. However, 51.3 parts by weight of a 75% solution of polyisocyanate B2 in methoxypropyl acetate/xylene 1:1 were used as curing component. The mixture was homogenized by stirring. The processing time was 3 to 4 hours. Films applied in a wet film thickness of 200 μm (corresponding to a dry film thickness of about 50 μm) were stoved at 120° C. for 30 minutes after exposure to air for 15 to 30 minutes.

The completely reacted films have the following properties:

Optical (gloss/color shade/turbidity): very good
Pendulum hardness (Albert/König): 160–170"
Solvent resistance
Mineral spirits: very good
Solvent naphtha 100: very good
Methoxypropyl acetate: very good
Acetone: good
Ethanol: good.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous binder composition comprising
   A) an aqueous solution or dispersion of a water-dilutable organic polyol component containing at least one polyester resin having carboxylate and hydroxyl groups and grafted with vinyl monomers and
   B) a polyisocyanate component which is emulsified in the aqueous solution or dispersion A), has a viscosity at 23° C. of 50 to 10,000 mPa.s and contains at least one organic polyisocyanate,
wherein the binder composition has an NCO/OH equivalent ratio of 0.5:1 to 5:1, based on the isocyanate groups of component B) and the alcoholic hydroxyl groups of component A).

2. The aqueous binder composition of claim 1 wherein said polyester resin has a molecular weight ($M_n$) of 1500 to 50,000, a hydroxyl number of 20 to 300 mg KOH/g of solids and an acid number of 10 to 80 mg KOH/g of solids; 25 to 100% of the carboxyl groups are present as carboxylates; and the polyester resin is the reaction product of
   I) 2 to 99% by weight of a monomer mixture containing
      1) 1 to 100% by weight of one or more unsaturated mono- or dicarboxylic acids having 3 to 16 carbon atoms,
      2) 0 to 70% by weight of one or more hydroxyfunctional alkyl esters of (meth)acrylic acid containing hydroxyalkyl group having 2 to 12 carbon atoms which may contain ether groups,
3) 0 to 98% by weight of one or more (meth)acrylic acid (cyclo)alkyl esters having 1 to 20 carbon atoms in the (cyclo)alkyl group and
4) 0 to 80% by weight of one or more other copolymerizable compounds,
wherein the percentages of 1) to 4) add up to 100%, and II) 1 to 98% by weight of a polyester polyol having a hydroxyl number of 10 to 500 mg of KOH/g of solids, an acid number of <30 mg of KOH/g of solids and a double bond content (calculated as C=C, molecular weight=24) of 0 to 15%, wherein the percentages of I) and II) add up to 100%.

3. The aqueous binder composition of claim 1 wherein component A) has a water content of 35 to 85% by weight, a viscosity at 23° C. of 10 to 30,000 mPa.s and a pH of 5 to 10.

4. The aqueous binder composition of claim 1 wherein said polyester resin has a molecular weight ($M_n$) of 1500 to 50,000, a hydroxyl number of 20 to 300 mg KOH/g of solids and an acid number of 10 to 80 mg KOH/g of solids; 25 to 100% of the carboxyl groups are present as carboxylates; and the polyester resin is the reaction product of I) 10 to 95% by weight of a monomer mixture containing
1) 1 to 50% by weight of one or more unsaturated mono- or dicarboxylic acids having 3 to 16 carbon atoms,
2) 0 to 50% by weight of one or more hydroxyfunctional alkyl esters of (meth)acrylic acid containing hydroxyalkyl group having 2 to 12 carbon atoms which may contain ether groups,
3) 0 to 90% by weight of one or more (meth)acrylic acid alkyl esters having 1 to 18 carbon atoms in the alkyl group and
4) 0 to 60% by weight of one or more other copolymerizable compounds,
wherein the percentages of 1) to 4) add up to 100%, and II) 5 to 90% by weight of a polyester polyol having a hydroxyl number of 80 to 350 mg of KOH/g of solids, an acid number of <10 mg of KOH/g of solids and a double bond content (calculated as C=C, molecular weight=24) of 0.1 to 10%, wherein the percentages of I) and II) add up to 100%.

5. The aqueous binder composition of claim 2 wherein polyester polyol II) is the reaction product of $a_1$) 0 to 60% by weight of one or more monocarboxylic acids having 6 to 22 carbon atoms,
$a_2$) 10 to 65% by weight of one or more di-, tri- and/or tetracarboxylic acids or their anhydrides,
$a_3$) 15 to 70% by weight of one or more difunctional and/or higher functional alcohols,
$a_4$) 0 to 30% by weight of one or more monohydric alcohols,
$a_5$) 0 to 25% by weight of one or more hydroxycarboxylic acids, lactones, amino alcohols and/or aminocarboxylic acids and
$a_6$) 0 to 60% by weight of one or more (cyclo)aliphatic, unsaturated mono- or dicarboxylic acids,
wherein the percentages of $a_1$) to $a_6$) add up to 100%.

6. The aqueous binder composition of claim 4 wherein polyester polyol II) is the reaction product of
$a_1$) 0 to 60% by weight of one or more monocarboxylic acids having 6 to 22 carbon atoms,
$a_2$) 10 to 65% by weight of one or more di-, tri- and/or tetracarboxylic acids or their anhydrides,
$a_3$) 15 to 70% by weight of one or more difunctional and/or higher functional alcohols,
$a_4$) 0 to 30% by weight of one or more monohydric alcohols,
$a_5$) 0 to 25% by weight of one or more hydroxycarboxylic acids, lactones, amino alcohols and/or aminocarboxylic acids and
$a_6$) 0 to 60% by weight of one or more (cyclo)aliphatic, unsaturated mono- or dicarboxylic acids,
wherein the percentages of $a_1$) to $a_6$) add up to 100%.

7. The aqueous binder composition of claim 2 wherein polyester polyol II) is modified to contain urethane groups.

8. The aqueous binder composition of claim 1 wherein said polyester resin has a molecular weight ($M_n$) of 3000 to 25,000, a hydroxyl number of 45 to 200 mg of KOH per g of solids, an acid number of 14 to 45 mg of KOH per g of solids and 40 to 100% of the carboxyl groups are present as carboxylates.

9. The aqueous binder composition of claim 2 wherein said polyester resin has a molecular weight ($M_n$) of 3000 to 25,000, a hydroxyl number of 45 to 200 mg of KOH per g of solids, an acid number of 14 to 45 mg of KOH per g of solids and 40 to 100% of the carboxyl groups are present as carboxylates.

10. The aqueous binder composition of claim 4 wherein said polyester resin has a molecular weight ($M_n$) of 3000 to 25,000, a hydroxyl number of 45 to 200 mg of KOH per g of solids, an acid number of 14 to 45 mg of KOH per g of solids and 40 to 100% of the carboxyl groups are present as carboxylates.

* * * * *